United States Patent
Sampatacos

[11] 3,749,415
[45] July 31, 1973

[54] STEERING KNUCKLE ASSEMBLY
[75] Inventor: Peter M. Sampatacos, Port Clinton, Ohio
[73] Assignee: General Motors Corporation, Detroit, Mich.
[22] Filed: June 21, 1971
[21] Appl. No.: 154,814

[52] U.S. Cl. ............... 280/96.1, 280/95, 287/90 R
[51] Int. Cl. ........................ B62d 7/08, B62d 7/20
[58] Field of Search ............... 280/96.1, 96.2, 96.3, 280/95; 188/18 R, 18 A; 287/87, 90 R, 90 C

[56] References Cited
UNITED STATES PATENTS

| | | | |
|---|---|---|---|
| 2,435,814 | 2/1948 | Allison | 280/96.1 |
| 2,356,164 | 8/1944 | Keese | 280/95 R |
| 3,295,636 | 1/1967 | Adams | 188/18 R |
| 3,332,518 | 7/1967 | North et al. | 188/18 A |
| 2,311,125 | 2/1943 | Phelps | 280/96.1 |
| 2,752,178 | 6/1956 | Hoffman | 280/96.1 X |
| 2,895,741 | 7/1959 | Mineck | 280/96.2 X |
| 3,292,958 | 12/1966 | Oishei | 287/87 |
| 3,563,564 | 2/1971 | Bartkowiak | 280/96.2 A X |
| 3,129,023 | 4/1964 | Fierstine | 287/90 C |
| 3,472,331 | 10/1969 | Baker et al. | 280/96.1 X |

*Primary Examiner*—Kenneth H. Betts
*Assistant Examiner*—John P. Silverstrim
*Attorney*—J. L. Carpenter and F. J. Fodale

[57] ABSTRACT

A steering knuckle assembly includes a symmetrical wheel support bracket and a symmetrical steering member which are juxtaposed in different relationships to provide a right-hand and a left-hand configuration. In one embodiment, the wheel support bracket includes integral drawn cup portions forming a part of the ball joints which pivotally mount the steering knuckle to the suspension control arms.

3 Claims, 9 Drawing Figures

INVENTOR
Peter M. Sampatacos
BY
F. J. Fodale
ATTORNEY 3,749,415

STEERING KNUCKLE ASSEMBLY

This invention relates generally to steering knuckles and more particularly to a multi-piece steering knuckle assembly.

Today, steering knuckles are generally cast or forged parts, wherein, a single casting includes a steering arm as an integral part thereof. Such practice requires separate configurations for the left-hand and the right-hand steering knuckles.

Such a design, that is, different right and left-hand configurations is costly since additional tooling, larger inventories and the increased handling of two different parts is required.

Moreover, the use of a casting for the steering knuckle including the steering arm generally results in a relatively heavy part requiring the other parts of the suspension and steering system to be of larger capacity and therefore costlier.

Accordingly, the object of my invention in its broadest aspect is to improve generally upon cast steering knuckles which are in common use today.

A feature of my invention is that the steering knuckle with the steering arm is designed into a steering knuckle assembly in which a minimum number of parts provide both a right-hand and a left-hand steering knuckle equipped with a steering arm.

Another feature of my invention is that the major parts of the steering knuckle assembly are all secured together at the same time thereby providing ease of assembly.

Another feature of my invention is that the major parts capable of both right-hand and left-hand use are all secured together at the same time.

Another feature of my invention is that the brake reaction member is mounted on the same part which provides the steering arm thereby further minimizing the number of parts in the assembly.

Still another feature of my invention is that the major load carrying parts of the steering knuckle assembly are secured together in a strong and efficient manner thereby eliminating any weak point in the steering system which might be attributable to the use of a multi-part steering knuckle assembly.

Yet, still another feature of my invention is to provide a steering knuckle assembly with one of the above features which is made from pressed metal thereby effecting a cost and weight savings. While pressed metal steering knuckle assemblies are shown in the prior art, for instance, U.S. Pat. No. 2,311,125 issued to R. H. Phelps on February 16, 1943 and U.S. Pat. No. 2,435,814 issued to W. D. Allison on Feb. 10, 1948, none of the prior art pressed metal steering knuckle assemblies to my knowledge have the above features of my invention.

In one of its embodiments, my object included that of integrating a portion of the ball joint into our steering knuckle assembly effecting a still further cost savings.

Other objects and features of the invention will become apparent to those skilled in the art as the disclosure is made in the following detailed description of preferred embodiments of the invention as illustrated in the accompanying sheets of drawing in which.

Figures 1, 2, 3, 4:
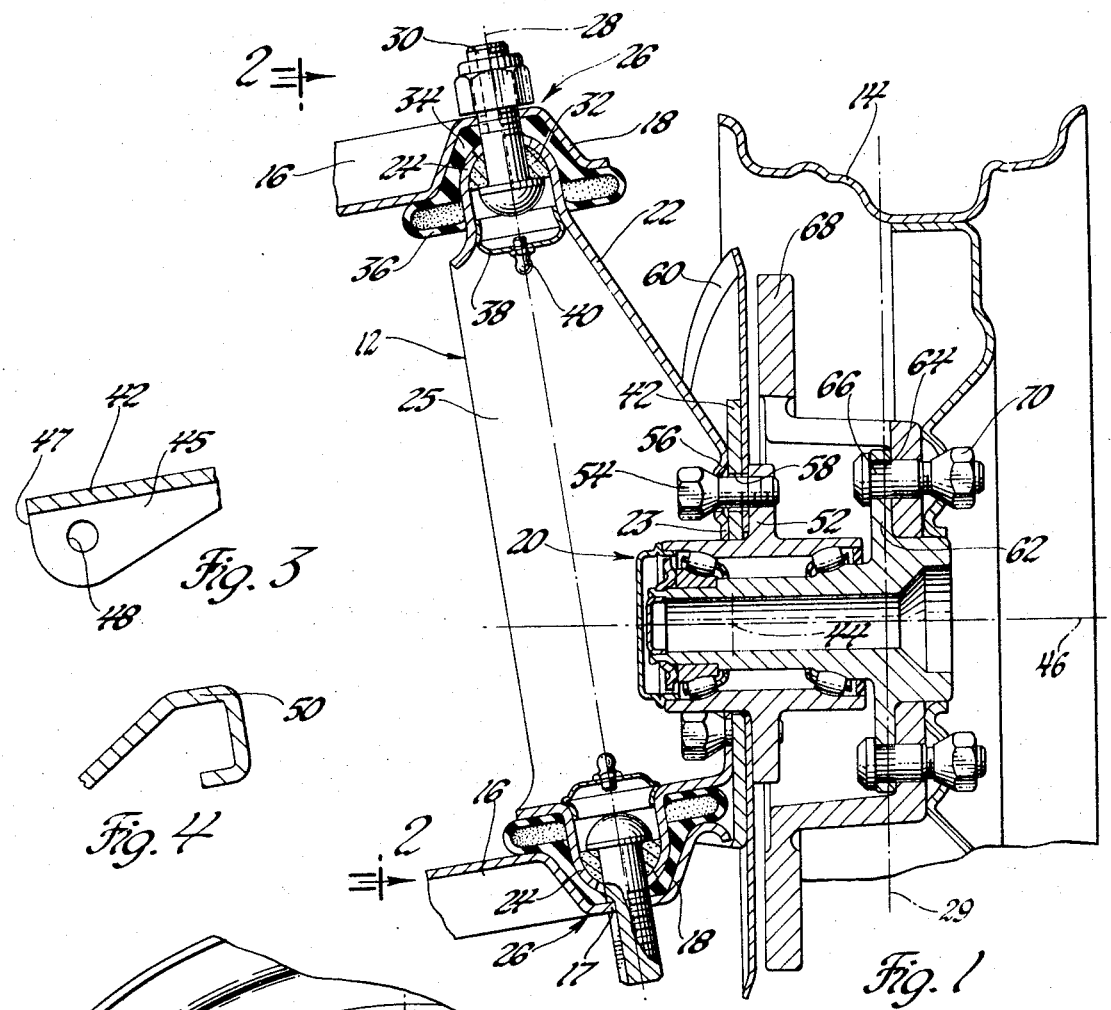
FIG. 1 is a front section view through a portion of a motor vehicle suspension for a steerable wheel provided with a steering knuckle assembly in accordance with my invention.
FIG. 2 is a side view taken along the line 2—2 of FIG. 1 and shows the relationship of the wheel support bracket and the steering member of the steering knuckle assembly shown in FIG. 1.

The brake reaction member, that is the brake caliper, has been omitted in FIGS. 1 and 2 for clarity.

FIG. 3 is a section taken along the line 3—3 of FIG. 2 and shows a detail of the steering arm portion of the steering member adapted for connection to a tie rod by a ball joint.

FIG. 4 is a section taken along the line 4—4 of FIG. 2 and shows the detail of a portion on the steering member to which the brake reaction member is mounted.

Figure 5:
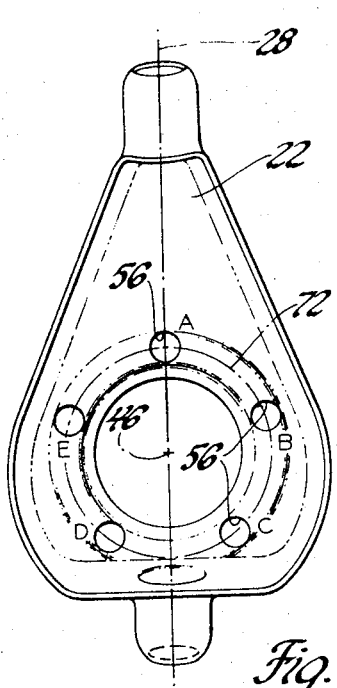

FIG. 5 is a side view of the wheel support bracket shown in FIGS. 1 and 2 with the mounting holes therein coded to explain the assembly relationships between the wheel support bracket and the steering member for right-hand and left-hand use.

Figure 6:
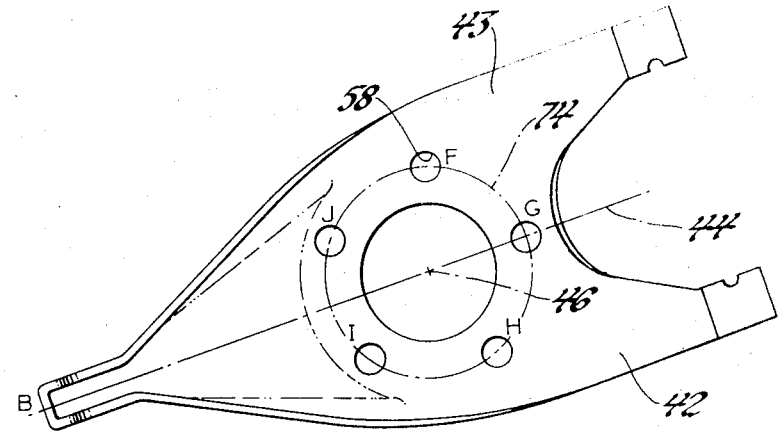

FIG. 6 is a side view of the steering member shown in FIGS. 1 and 2 with the mounting holes therein also coded to explain the assembly relationship for right-hand and left-hand use.

Figure 7:
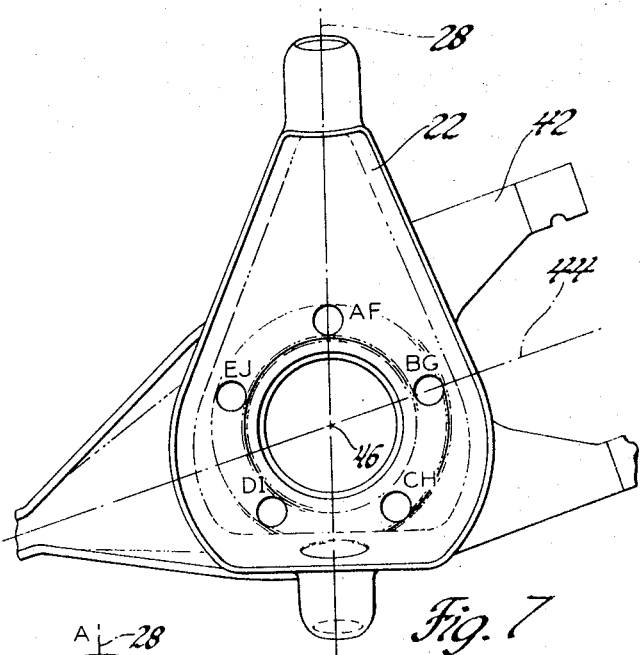

FIG. 7 is a side view of the wheel support bracket and the steering member showing one of their assembled relationships.

Figure 8:
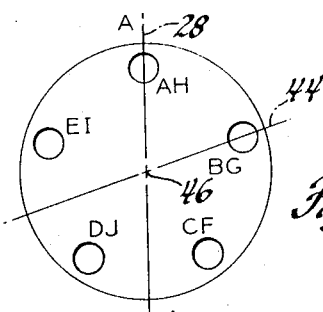

FIG. 8 is a schematic comparable to FIG. 7 showing the matching of the bolt holes in the wheel support bracket and the steering member in the other of their assembled relationships.

Figure 9:
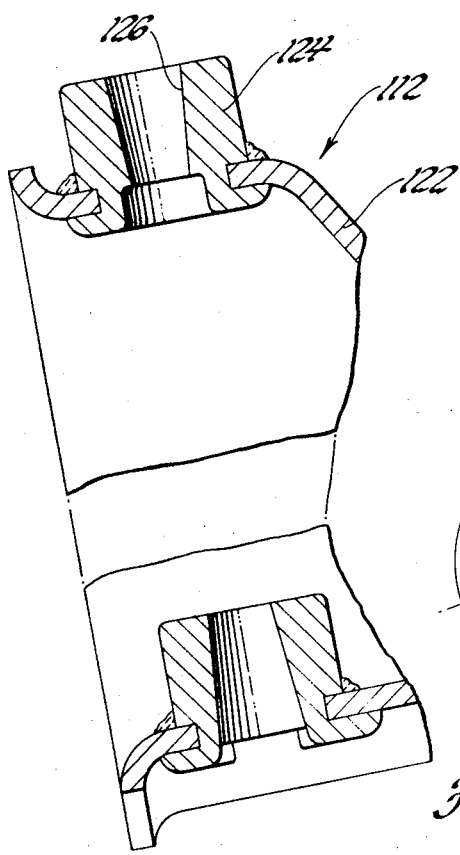

FIG. 9 is a front section view of a second embodiment of a support bracket.

Referring now to the drawings and more particularly to FIG. 1 there is shown a steering knuckle assembly indicated generally at 12 used to support a steerable wheel 14 independently suspended on a pair of spaced control arms 16 which are pivotally mounted on a vehicle body (not shown).

The steering knuckle assembly 12 carries the stationary hub of a unit handled anti-friction bearing assembly indicated generally at 20. The wheel 14 in turn is carried by the rotatable spindle or "live axle" of the bearing assembly 20.

The steering knuckle assembly 12 comprises a pressed metal wheel support bracket 22 which is dish shaped having a planar portion 23 and a side wall 25 with two integral deep drawn cup portions 24. The cup portions 24 form housings for the upper and lower ball joints 26 which pivotally mount the wheel support bracket to the upper and lower control arms 16 for steering movement about the axis 28. Besides the housing 24, each of the ball joints 26 include a ball stud 30 with a partispherical head disposed in the housing which together with a powdered metal ball annulus 32 forms a ball. A hard plastic bearing seat 34 with a flexible sealing lip 36 is disposed between the exterior of each of the housings 24 on the wheel support bracket 22 and one of the control arms 16. The stud 30 extends out of a recess 18 in the housing portions 24 on the ball studs through aligned holes in the plastic bearing seats 34 and the control arms 16. Nuts threaded on the end of the ball stud portions secure the ball joint 26 to the control arms 16 thus pivotally mounting the wheel support bracket thereto about the steering plane 28 which in this instance is canted combined with respect to a vertical axis 29 through the center of the wheel 14. The ball stud portions are keyed to the control arms 16 at 17 to prevent rotation of the ball stud portion with respect to the control arms.

The flexible seal lip 36 on the plastic bearing seat engages the exterior of the ball housing 26 to prevent the entry of dirt and other matter between the plastic bearing seat 34 and that portion of the housing 24 which forms a bearing with it. A cover 38 with a central grease fitting 40 protects the interior of the ball joint 26.

The steering knuckle assembly 20 also includes a pressed metal steering member 42 which is symmetrical about the axis 44. See FIG. 2. The axis 44 is skewed with respect to the steering axis 28 and appears to intersect it at an imaginary point 46 at the center of the live axle. However, by referring momentarily back to FIG. 1, it can be seen that the axis 44 is actually spaced from the steering axis 28 and that the point 46 is actually an axis 46 through the center of the bearing assembly 20.

Returning to FIG. 2, it is seen that the steering member 42 has a flat portion 43 and is folded or dish shaped at its left-hand end to provide strengthening flanges 47 on an integral steering arm 45. The flanges 47 have aligned apertures 48 which receive the stud portion of a ball joint (not shown) used to connect the steering arm 45 to a tie rod for steering the wheel 14. The detail of the tie rod connection end of the steering member 42 is shown in FIG. 3. It is to be understood that in some instances a sleeve may be inserted in the aligned holes 48 for receipt of the ball joint stud. In some instances, it may be desirable to taper this sleeve for use with a tapered shank type of ball joint. In such instances, the steering member would not be symmetrical about the axis 44 after a tapered sleeve had been assembled thereto. However, the steering member minus the tapered sleeve would be symmetrical.

The right-hand end of the steering member as seen in FIG. 2 has two spaced tongues 50 which are shown in FIG. 4 as being channel shaped in cross section. The two spaced tongues 50 are used to mount the reaction member of a brake such as the caliper assembly in a disc type brake. The caliper assembly has been omitted from the several figures in order to more clearly show the adjacent structure of the wheel assembly.

Referring now to FIGS. 1 and 2, the wheel support bracket 22 and the steering member 42 are both secured to an integral flange 52 on the hub of the bearing assembly 20.

The means for securing the two parts of the steering knuckle assembly 12 together, which in this case is by securing both to the bearing assembly 20, is important. As disclosed herein, the securing means comprises a number of bolts 54 which extend through aligned holes 56 and 58 in the planar portion 23 of the wheel support bracket 22 and in the flat portion 43 of the steering member 42 respectively. The bolts 54 are threadably received in the flange 52 of the bearing assembly 20. The bolt and hole pattern is an important feature to this invention. As can more clearly be seen in FIG. 2, the bolt and hole pattern comprises an array of discrete securing elements equally circumferentially spaced about a circle centered about the bearing axis 46. In the specific example of this disclosure, five discrete securing elements in a pentagon array are used. This array is symmetrical about both the axis 28 and the axis 44. The specific reason for this pattern is to provide both a right-hand and a left-hand steering knuckle assembly.

The specific manner in which this is accomplished will be explained more fully hereinafter with respect to FIGS. 5, 6, 7 and 8.

Returning to FIG. 1, it is seen that the steering knuckle assembly also includes a splash shield 60 having a plurality of holes in the aforementioned pattern. The splash shield 60 is sandwiched between the steering member 42 and the flange 52 on the bearing assembly 20.

It is to be noted that the manner of securing the two parts 22 and 42 of the steering knuckle assembly together simultaneously with being secured to the flange 52 provides ease of assembly and also a strong connection of relatively high load carrying capacity since the bolt holes are placed in completely continuous portions on the two parts. The planar portion 23 of the wheel support bracket 22 and the flat portion 43 of the steering member 42 are closed box structures and as such are relatively strong. Another feature to be noted is that the steering member 42 also includes tongues 50 for mounting the brake reaction member (not shown). This minimizes the number of parts in the assembly and is possible because of the relatively high load capacity of the securing means which must take the torque imposed on it by the brake reaction member.

The spindle portion of the bearing assembly 20 includes a second integral flange 62 having a plurality of bolts 64 with serrated shanks 66 pressed into holes in the second flange 62. The threaded ends of the bolts extend away from the flange 52 on the hub of the bearing assembly thus adapting the bearing assembly spindle for convenient attachment of the wheel 14 and a brake disc 68 thereto by nuts 70 threadably received on the ends of the bolts 64.

Referring now to FIG. 5, the front view of the wheel support bracket 22 is shown with its pentagon array of holes 56 coded A, B, C, D and E starting at a 12 o'clock position on the bolt hole circle 72 and moving clockwise therefrom. The front view as seen in FIG. 5, is that seen from the interior side of the wheel 14 on the left-hand or driver's side of the automobile. Similarly, FIG. 6 shows the steering member 42 oriented for left-hand use when seen from this same vantage point. The bolt holes 58 in the steering member 42 have been coded F, G, H, I and J starting with the 12 o'clock position on the bolt hole circle 74 and proceeding clockwise therefrom. It is to be noted that both the bolt hole circle 72 and bolt hole circle 74 are on equal radii centered from the bearing axis 46.

FIG. 7 shows the relationship of the wheel support bracket 22 and the steering member 42 just prior to assembly onto the hub 52 (shown in FIG. 1) of the bearing assembly 20 to provide the left-hand steering knuckle assembly. In the left-hand configuration the hole A of the wheel support bracket 22 is aligned with the hole F of the steering member 42, the hole B of the wheel support bracket 22 is aligned with the hole G of the steering member 42, etc.

Referring now to FIG. 8, there is shown a schematic illustrating the matching of the aforementioned coded bolt holes in the wheel support bracket 22 and the steering member 42 for assembly to the flange 52 on the bearing assembly 20 to form the right-hand steering knuckle. In order for the wheel support bracket 22 to provide the right-hand wheel support bracket, it is rotated 180° about the steering axis 28. See FIG. 5. With the bolt hole matching pattern being viewed from the same vantage point, that is the interior side of the wheel, the relative position of the bolt holes on the wheel support bracket 22 remains the same. That is, hole A remains in the 12 o'clock position and holes B, C, D and E are equally circumferentially spaced sequentially therefrom on the bolt hole circle 72 in the clockwise direction. In order for the steering member 42 to provide the right-hand steering member it is rotated 180° about the axis 44. See FIG. 6. With the bolt hole pattern in the steering member being viewed from the same vantage point, that is the interior side of the right-hand wheel, the positions of the bolt holes F and H and J and I are reversed. Thus, while the hole G remains in the same relative position at approximately 2 o'clock the holes proceed H, I, J, and F in the counterclockwise rather than the clockwise direction therefrom. This matching of holes is shown in FIG. 8 wherein the hole A in wheel support bracket 22 is aligned with the hole F in the steering member 42, the hole B in the wheel support bracket 22 is aligned with the hole G with the steering member 42, etc. The steering member 42 and the wheel support bracket 22 are secured in this relationship to the bearing flange 52 in the right-hand steering knuckle assembly.

It is to be understood, of course, that while the use of a pentagon array of bolt holes, that is, five bolt holes equally circumferentially spaced on equal bolt hole circles on the wheel support bracket 22 and the steering member 42 has been illustrated for purposes of disclosure that other arrays may be used so long as the array is symmetrical about both of the axes 28 and 44.

Referring now to FIG. 9, there is shown the front section view of an alternate wheel support bracket 122 which can be used for a steering knuckle assembly indicated generally at 112 in accordance with my invention. The wheel support bracket 122 has separate sleeves 124 secured thereto in place of the integral ball joint housing 24 on the wheel support bracket 22. The sleeves 124 have tapered bores 126 which are adapted to receive the stud portion of a ball joint. When the wheel support bracket 122 is used, the stud portions of the ball joints are secured to the wheel support bracket and the ball joint housings are secured to the suspension control arms.

I wish it to be understood that I do not desire to be limited to the exact details of construction shown and described, for obvious modifications will occur to a person skilled in the art.

We claim:

1. In a mounting assembly for a steerable wheel rotatably mounted on a bearing for rotation about a wheel axis, said bearing including a stationary flange, a steering knuckle assembly comprising:

a single piece, pressed metal support bracket having an axis and a continuous circumferential strengthening flange with means for mounting said wheel support bracket in a steerable wheel suspension system to pivot about said axis, said support bracket having a flat portion provided with a plurality of equally circumferentially spaced holes, said support bracket being symmetric to a plane passing through said axis, a single piece, elongated pressed metal steering member having a longitudinal axis, said steering member having a flanged steering arm end portion, a flat central portion provided with a plurality of equally circumferentially spaced holes aligned with said first mentioned holes and a bifurcated end portion for mounting a brake reaction member, said steering member being symmetric to a plane passing through said longitudinal axis, means extending through said aligned holes simultaneously securing said support bracket and said steering member to said flange in an asymmetrical configuration with said planes intersecting each other at said wheel axis, said bolt holes being arrayed symmetric to both of said planes whereby said support bracket and said steering member when reversed about said axis and said longitudinal axis respectively and secured to said flange form a corresponding asymmetrical configuration of opposite hand, and said bolt holes being concentric with said wheel axis and being provided in continuous portions respectively of said flat portions of said support bracket and said steering member thereby providing a strong connection between said support bracket, said steering member and said bearing flange.

2. A ball joint for pivotally mounting a wheel support bracket to a control arm, or the like, comprising:

a pressed metal housing integral with said wheel support bracket, ball stud means having a head portion slideably engaging the interior of said housing, an annular bearing seat slideably engaging the exterior of said housing opposite said head portion, a stud on said ball stud means extending out of said housing and through said bearing seat, and means non-rotatably securing said stud to said control arm with said annular bearing seat sandwiched between said housing and said control arm.

3. The combination as defined in claim 2 further including an integral flexible lip on said bearing seat which wipingly engages the exterior of said housing to exclude the entry of deleterious matter into the area of contact between said bearing seat and said housing.

* * * * *